Aug. 13, 1929.                W. H. DAVIS                1,724,459
                    SAWING ATTACHMENT FOR AUTOMOBILES
                    Filed April 7, 1926        2 Sheets-Sheet 1

INVENTOR.
Wade H. Davis
BY Paul B Eaton
ATTORNEY.

Aug. 13, 1929.  W. H. DAVIS  1,724,459
SAWING ATTACHMENT FOR AUTOMOBILES
Filed April 7, 1926    2 Sheets-Sheet 2

INVENTOR.
Wade H. Davis
BY Paul B. Eaton
ATTORNEY.

Patented Aug. 13, 1929.

1,724,459

UNITED STATES PATENT OFFICE.

WADE H. DAVIS, OF WALNUT COVE, NORTH CAROLINA.

SAWING ATTACHMENT FOR AUTOMOBILES.

Application filed April 7, 1926. Serial No. 100,331.

My invention relates to power take-off means adapted to be attached to the rear wheels of an automobile, said power take-off means having work performing means such as a wood saw associated therewith.

An object of my invention is to provide a portable wood saw which is easily attached and detached to the rear wheels of an automobile, with the wheels of the automobile in elevated position.

Another object of my invention is to provide a wood saw attachment which is capable of being attached to any style of automobile, including automobiles having gas tanks located on the rear end of the machine.

Another object of my invention is to provide a wood saw which is adapted to be attached to and driven by the rear wheels of an automobile, regardless of the size of the rear wheels of the automobile.

Another object of my invention is to provide an attachment adapted to the rear wheels of an automobile, said attachment having a power pulley attached to a power take-off shaft.

Having thus stated some of the objects of my invention, a brief description of the various figures in the drawings will now follow, in which Figure 1 is a side elevation of my device showing it attached to the rear wheels of an automobile;

A brief description of the drawings having been given, a detailed description of my device will now be undertaken, in which like reference characters indicate corresponding parts throughout the drawings.

Figure 1:
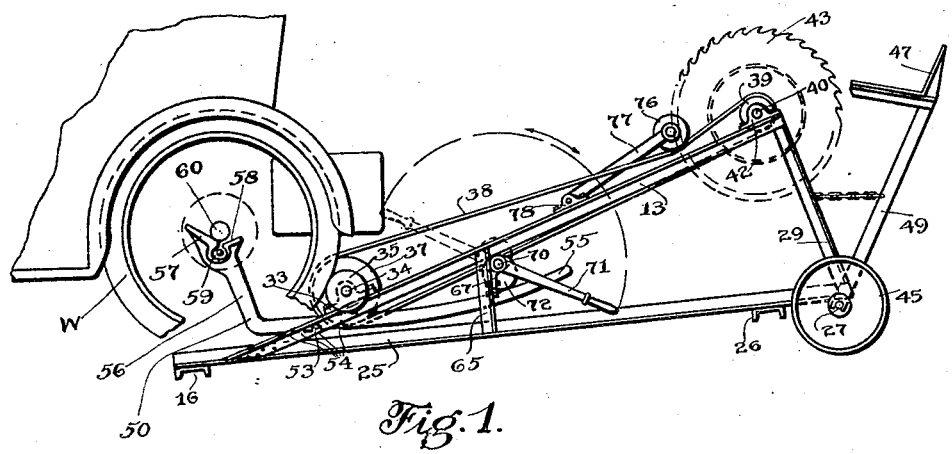
Figure 2:
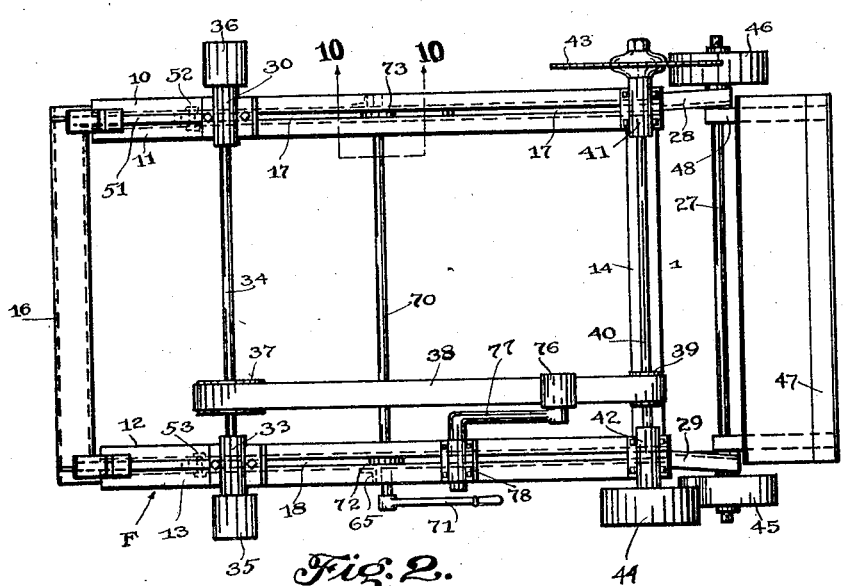
Figure 2 is a plan view of my sawing attachment for automobiles.
Figure 3:
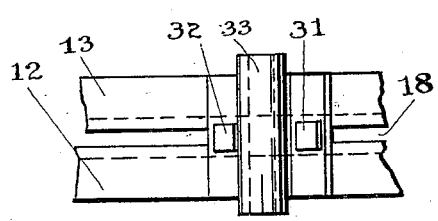
Figure 3 is a detail plan view of the adjustable bearing for the counter shaft.

The main frame F of my device is composed of the front cross member 16, the side members 25, (only one of these members being shown) and the rear cross-piece 26. The side members 25 project rearwardly of the cross member or cross-piece 26 and have the axle 27 secured thereto. Also secured to the rear portions of the members 25 are the upwardly and forwardly projecting members 28 and 29.

Figure 7:
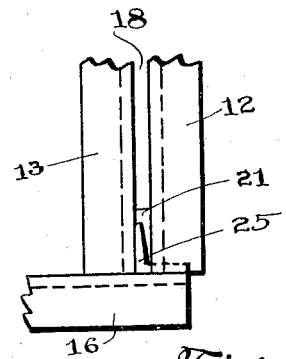
Figure 7 is a detail view showing the manner in which the upper members which support the shafts are secured to the side portions of the frame.
Figure 4:
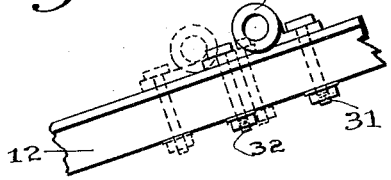
Figure 4 is a side elevation of Figure 3, showing in dotted lines the position of parts when the device is attached to an automobile having small wheels.
Figure 5:
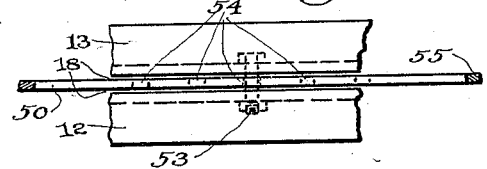
Figure 5 is a detail plan view of a portion of the jack and associated parts for lifting the rear wheels of the automobile.
Figure 6:
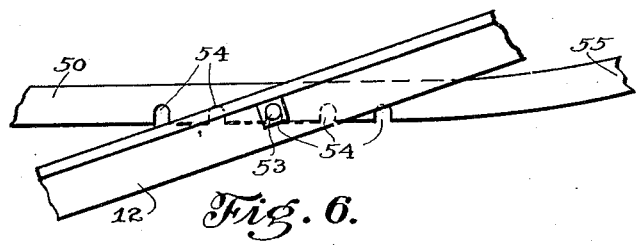
Figure 6 is a side elevation of Figure 5.
Figures 8, 9:
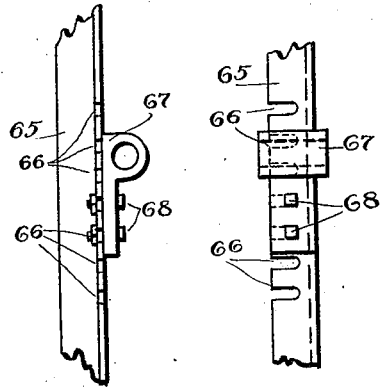
Figure 8 is a detail side elevation showing the manner in which the cam for depressing the rear ends of the lifting jacks is adjusted.
Figure 9 is a rear elevation of Figure 8.
Figure 10:
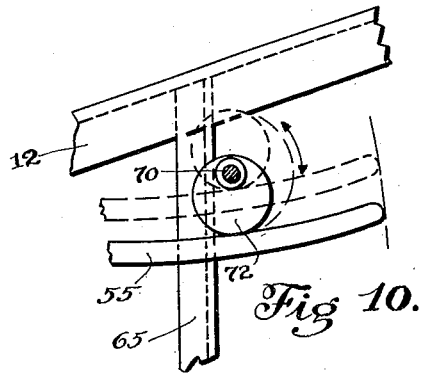
Figure 10 is a detail side elevation of the cam for depressing the rear ends of the lifting jacks.

Secured to the forward portions of the members 25 are the members 10, 11, 12 and 13, the members 10 and 11 being secured to opposite sides of one of the members 25, and 12 and 13 are secured to opposite sides of the other member 25. Being thus secured to the side members 25, causes a slot 17 to be left between the members 10 and 11, and a slot 18 to be left between the members 12 and 13. The manner in which these members 10, 11, 12, and 13 are secured to the side members 25 is best illustrated in Figure 7, wherein the members 12 and 13 fit onto both sides of the upright portion of the member 25, and a wedge 21 is placed between the member 25 and the member 13 with suitable means, such as bolts (see Fig. 1) passing therethrough to secure the parts in position.

Adjustably mounted on the upper faces of the members 10 and 11 is the journal bearing 30, which is secured in any desired position by the bolts 31 passing therethrough and through the slot 17, and through the cuffs 32 on the lower sides of members 10 and 11. The journal bearing 33 is likewise secured to the members 12 and 13, hence a description of the same is deemed unnecessary. A rotatable shaft 34 is mounted in these journal bearings, said shaft having friction wheels 35 and 36 mounted on opposite ends of said shaft. A pulley 37 is rigidly secured on the shaft 34 at a point intermediate the journal bearings 30 and 33 which is adapted to receive a belt 38, which belt runs over the pulley 39 on the rotatable shaft 40, said shaft being mounted in the journal bearings 41 and 42, which are secured to the rearmost portions of the members 10, 11, 12 and 13. A saw 43, or other work performing means is mounted on the shaft 40.

The axle 27 has wheels 45 and 46 mounted thereon, said wheels being adapted to serve as supports for the device while the same is being used in connection with the rear wheels of an automobile, and also as transporting means for the device.

A saw table 47, having downwardly extending arms 48 and 49, is pivoted to swing on the axle 27.

It is readily seen from the above description that the slots 17 and 18 are left for a purpose, this purpose being to allow the counter shaft 34 to be adjusted along said slots, and also to provide a pivotal point for the levers or jacks 50 and 51.

Bolts 53 and 52 are secured to the frame members 10 and 11, and to the members 12 and 13, running across the slots 17 and 18. The jacks 50 and 51 have a plurality of notches 54 in their lower sides adapted to engage the bolts 52 and 53. These jacks 50 and 51 have rearwardly and slightly upwardly extending ends 55, and also have forwardly and abruptly upwardly extending portions 56, the portions 56 having diverging jaws 57 and 58 and a notch 59 located at the apex of the said diverging portions. This notch 59 is adapted to receive the truss rod appearing on some makes of automobiles, and located beneath the rear axle.

The rear axle 60 of the automobile has wheels W located thereon, said axle being adapted to ride on the face of the diverging portions 57 of the jacks 50 while in elevated position, while the diverging portion 58 serves to prevent the axle 60 from approaching too near the friction pulleys 35 and 36 mounted on the ends of the counter shaft 34.

Extending from the frame member 13 to the side member 25 is the approximately vertical member 65, which member has notches 66 therein in which the bearing member 67 is adapted to be adjustably secured by suitable means such as the bolts 68. A similar arrangement as that just described is mounted between the member 10 and the other side member 25, hence a description of the same is unnecessary.

A rotatable shaft 70 is mounted in the bearing members 67, which has a lever 71 rigidly secured to one end thereof, and cams 72 and 73 are rigidly secured to the shaft 70 at points immediately below the slots 17 and 18.

A weight pulley 76 is secured to one end of a lever 77, the other end of the lever 77 being rotatably mounted in the bearing 78, located on the members 12 and 13. This arrangement takes up the slack in the belt 38.

The rear portions of the members 10, 11, 12 and 13 are secured to each other by means of the cross-members 14 and 15, which are immediately below the shaft 40.

The shaft 40 has a power pulley 44 located on one end thereof. This pulley 44 is adapted to receive a belt, which may be connected to any desired machine to which power is desired to be delivered.

The method of operation of my device is as follows:

In transporting the device from place to place the beam 16 is secured to the rear body portion of the automobile by any suitable means such as a rope, chain or cable (not shown) being passed around the member 16 and around the rear bumper of the automobile or other portion of the automobile.

When it is desired to attach the device to the rear wheels of an automobile for the purpose of performing work, such as sawing wood, the device is detached from the automobile and pushed under the rear end of the said automobile to the proper position, and the lever 71 is turned in a clockwise direction (see Fig. 1) from the position shown in dotted lines to the position shown in bold lines. This causes the cams 72 and 73 to push the portions 55 of the levers 50 and 51 downwardly, and therefore, elevates the forward portions of the levers 50 and 51, causing the portions 57 to engage the rear axle of the automobile and thereby raise the wheels from the ground and press them against the friction pulleys 35 and 36.

It will be seen that by adjusting the levers 50 and 51 as to their fulcrum point in the notches 54, the bearing members 30 and 33 in the slots 17 and 18 and the bearing members 67 in the notches 66 that this device can be adjusted to be used with an automobile having any sized wheels, while heretofore each device has been especially built for one type of automobile, and could not be used with other types.

It will be seen that I have devised a sawing attachment for automobiles which can be used with automobiles having low rear fenders, gas tank in the rear, truss rod beneath the rear axle, large or small wheels, or with one having rear bumpers.

Having thus fully described my invention, what I desire to secure and protect by Letters Patent of the United States is as follows:

I claim:

1. In an attachment adapted to be secured to the rear wheels of an automobile, the combination of a frame, longitudinally adjustable levers mounted in the frame and adapted to lift the rear wheels of the automobile, a longitudinally adjustable counter shaft, friction pulleys on said shaft, a vertically adjustable cam shaft, cams on said cam shaft adapted to engage the rear portions of the longitudinally adjustable levers, all of said parts cooperating to raise the rear wheels of the automobile and to press them into engagement with the friction pulleys.

2. In a sawing attachment adapted to be secured to the rear wheels of an automobile, a main frame, a super-structure on the main frame, two longitudinally extending slots in the super-structure, bearings mounted on the super-structure and adapted to be adjusted longitudinally of the super-structure in said slots, a rotatable shaft mounted in said bearings, friction pulleys mounted on the rotatable shaft, levers adjustable as to their fulcrum points mounted in the slots, saddle portions in the front ends of said levers, rear portions to said levers, an adjustable cam shaft for depressing the said rear portions of the levers, cams on the shaft, all of said parts cooperating to raise the rear wheels of the automobile and to bring them into engagement with the friction pulleys.

3. In a power take-off adapted to be attached to the rear end of an automobile, a horizontally disposed frame, a forwardly inclined frame secured on the horizontally disposed frame, wheels for supporting the rear end of the frames, a pulley shaft, pulleys mounted on said pulley shaft and being located in the forward portion of the frame, a second rotatable shaft mounted in the rear portion of the inclined frame and having work performing means mounted thereon, driving connections between the two shafts, levers pivotally mounted intermediate their ends in the inclined frame, the forward portions of the levers being adapted to engage the rear axle housing of an automobile and to press the rear wheels of the automobile into engagement with the pulleys on the first rotatable shaft, a third rotatable shaft mounted intermediate the inclined frame, cams on said said third rotatable shaft adapted to engage the rear ends of the lever for raising the wheels, and a lever fixedly secured on the third shaft for operating the same.

4. In a combined power take-off and sawing device for the rear wheels of automobiles, a frame having a triangular vertical cross-section, a rotatable shaft, pulleys on said shaft adapted to engage the automobile wheels and being mounted at the apex of the frame, a second rotatable shaft mounted at one of the base corners of the frame, supporting wheels mounted at the other base corner of the frame, levers mounted in the frame on each side thereof and having their front ends adapted to engage the rear axle housing of an automobile and press the said wheels against the pulleys thereon, driving connections between the rotatable shafts, a transversely disposed shaft mounted in the intermediate portion of the frame, cams on the ends of the shaft adapted to press against the rear ends of the levers for raising the wheels of the automobile, a lever secured to the end portion of the last named shaft for operating the same to move the shaft and cams to adjusted position, and work performing means mounted on the second rotatable shaft.

In testimony that I claim the foregoing as my own, I have signed this specification.

WADE H. DAVIS.